United States Patent [19]

Hendricks

[11] Patent Number: 5,004,540
[45] Date of Patent: Apr. 2, 1991

[54] INVERTIBLE FILTER-TYPE CENTRIFUGE WITH IMPROVED BEARING AND SEAL ASSEMBLY

[75] Inventor: James B. Hendricks, Lakeside, Calif.
[73] Assignee: Ketema Process Equipment Division, Santee, Calif.
[21] Appl. No.: 445,010
[22] Filed: Dec. 1, 1989
[51] Int. Cl.⁵ ............................................. B01D 33/067
[52] U.S. Cl. ....................................... 210/232; 210/370; 210/380.1; 494/41; 494/83
[58] Field of Search .................. 210/232, 360.1, 360.2, 210/365, 367, 370, 380.1; 494/38, 41, 83

[56] References Cited

U.S. PATENT DOCUMENTS

| | | | |
|---|---|---|---|
| 3,225,934 | 12/1965 | Van Riel | 210/370 |
| 3,315,882 | 4/1967 | Reed | 494/38 |
| 3,623,613 | 11/1971 | Quetsch | 210/370 |
| 4,193,874 | 3/1980 | Gerteis | 210/370 |
| 4,675,106 | 6/1987 | Schoendorfer et al. | 210/232 |
| 4,944,874 | 7/1990 | Kobayashi et al. | 210/370 |

FOREIGN PATENT DOCUMENTS

| | | | |
|---|---|---|---|
| 2742601 | 3/1978 | Fed. Rep. of Germany | 494/41 |
| 2542219 | 9/1984 | France | 494/38 |
| 993926 | 6/1965 | United Kingdom | 494/41 |

Primary Examiner—Robert A. Dawson
Assistant Examiner—Joseph Drodge
Attorney, Agent, or Firm—Baker, Maxham, Jester & Meador

[57] ABSTRACT

An invertable filter centrifuge having a housing defining a centrifuge chamber with a perforated drum mounted in said chamber on the front end of a hollow shaft which is rotatably mounted at the front end by a front bearing assembly and slideably mounted on a central shaft having a base plate mounted on a front end thereof with a filter cloth which is disposed with one end attached to the drum and the other end attached to said base plate and normally disposed within said drum with double acting piston means for displacing the drum axially for inverting the filter cloth, a quantity of lubricating fluid for contacting bearings in the bearing assembly with, and a nitrogen gas pressurized seal disposed between the bearing assembly and the centrifuge chamber for inhibiting the passage of contaminants therebetween.

12 Claims, 3 Drawing Sheets

INVERTIBLE FILTER-TYPE CENTRIFUGE WITH IMPROVED BEARING AND SEAL ASSEMBLY

BACKGROUND OF THE INVENTION

The present invention relates to centrifuges capable of separating solid and liquid components of a slurry, and more particularly, to centrifuges of the type that include a perforated drum or basket with a filter cloth which is insertable therein and from which the drum may be pulled away to invert the filter cloth to effectuate a clean discharge of the filter cake into a receiving hopper.

In the production of numerous chemical products such as fertilizers and pharmaceuticals, solid particles are suspended in a liquid vehicle to form a slurry. It is necessary to remove the liquid vehicle in the most efficient manner. Vacuum techniques for drawing away the liquid are inherently inefficient. The use of heat to vaporize the liquid consumes too much energy, and in many cases, will adversely effect the chemical compounds present in the suspended particles. Accordingly, centrifuges are widely used to spin the liquid out of slurries in many chemical and pharmaceutical processing operations.

U.S. Pat. No. 3,623,613 of Quetsch granted Nov. 30, 1971 discloses a centrifuge for separating liquid and solid components from a suspension, wherein the centrifuge is provided with a centrifugal drum and a cloth filter insertable therein. A boundary edge of the filter is attached to the discharge end of the centrifugal drum and the other boundary edge is attached to a mushroom shaped bottom piece or disc. The centrifugal drum and bottom piece are arranged co-axially with respect to each other and are rotatable together. In addition, the drum and bottom piece are relatively axially moveable with respect to each other during rotation for inverting the filter. A lid is mounted to the bottom piece and contacts the discharge end of the drum when the bottom piece is located at the bottom of the centrifugal drum during the centrifuging process. The lateral walls of the centrifugal drum are perforated to enable the passage of liquid. Slurry is gradually introduced into the drum and the centrifugal force causes the liquid therein to pass through the filter cloth and through the perforated drum. However, suspended particles in the slurry soon occupy the interstices between the fibers of the filter cloth. Accordingly, as additional slurry is introduced the built up solids on the filter cloth themselves facilitate the separation of the liquids and solids in the slurry by a process known as "cake filtration." At the appropriate time, the drum 16 and bottom piece 23 are axially separated by axial movement of shaft 12 by piston 34 while they are still rotating together. This action serves to invert the filter cloth which is connected between the drum and bottom piece for discharge of the filter cake therein. The result is a clean discharge of the filter cake into a receiving hopper for transport to further processing. The drum and bottom piece are then moved axially together to reinsert the filter cloth against the interior walls of the drum so that another filtration cycle can begin.

The foregoing type of inverting filter cloth centrifuge typically operates at high RPM, such as 2000 RPM, in order to maximize the efficiency of the separation process. The interior diameter of the drum may measure, for example two feet across. Accordingly, the centrifugal forces exerted on and its supporting structures and rotating shaft are substantial. Therefore, reliable and precise balance and support of the rotating structures are critical to an effective and economical machine.

The liquids separated from the slurries are often acids or other corrosive compounds that can attack the bearings and their protective seals. It is critical that the shaft support bearings be well lubricated and well protected from chemical attack. The seals that protect the bearings must also insure that lubricant does not leak into the product being processed.

The filter cloth is inverted for discharge or recovery of the filter cake or solids while it is rotating at high RPM. This is accomplished by the axial shifting of rotating shafts and certain supporting structures. Therefore the axially moveable and rotating shafts must be well balanced and sealed at all positions in their axial movement.

The prior art structures disclosed in the above and in the following patents incorporate the shifting cylinders of the shifting mechanism directly in the axially shifting shafts. While this has some advantages as to compactness, it is expensive and makes bearing support and sealing more difficult.

U.S. Pat. No. 4,193,874 of Gertels granted Mar. 18, 1980 is directed to and relates to the use of a support screen 41 (see FIG. 2) disposed between the filter cloth 22 and the side wall of the drum in a centrifuge of the foregoing type. The base plate is shifted outward by axial shifting of shaft 12 and its extension 33 by piston 34 as in the prior patent.

U.S. Pat. No. 3,623,613 of Quetsch, granted Nov. 30, 1971, discloses an inverting filter centrifugal separator having a hollow shaft 4 and supporting sleeve 2 which shift axially to pull the drum away from the base plate or disc for inverting the filter. The hollow shaft and sleeve serve as hydraulic pistons for the axial shifting. Thus high pressure hydraulic fluid is applied directly to the end of the shaft for shifting it. This results in the aforementioned difficulty of effectively sealing the bearings and other critical components against liquids in the system.

Accordingly it desirable that effective and reliable bearing support and sealing be provided in an inverting filter centrifugal separator.

SUMMARY OF THE INVENTION

Accordingly, it is the primary object of the present invention to provide an improved bearing seal assembly for an inverting filter type centrifuge.

DESCRIPTION OF THE PREFERRED EMBODIMENTS

Figure 1:
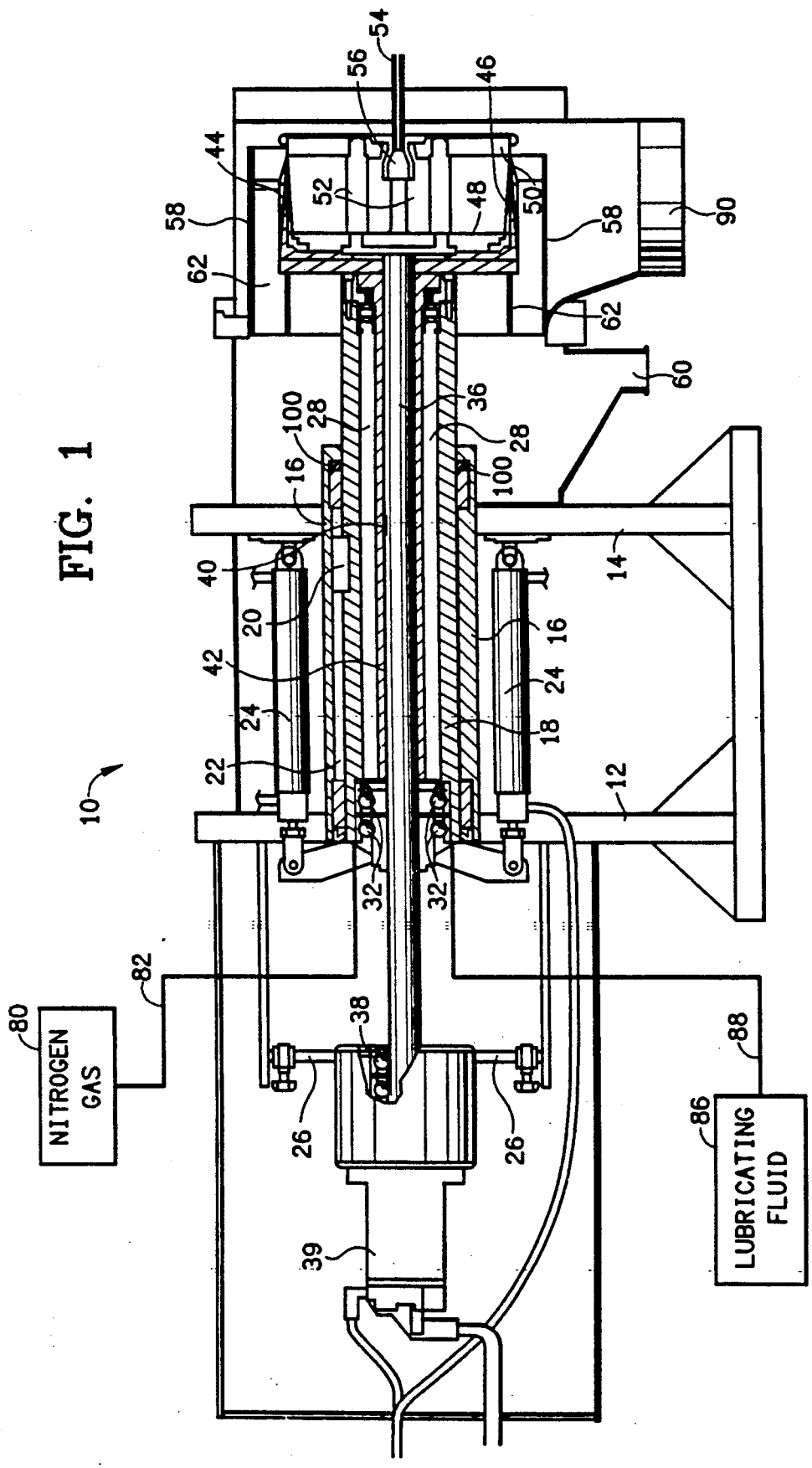
FIG. 1 is a side elevation view in section of a preferred embodiment of the invention in the operative position.
Figure 2:
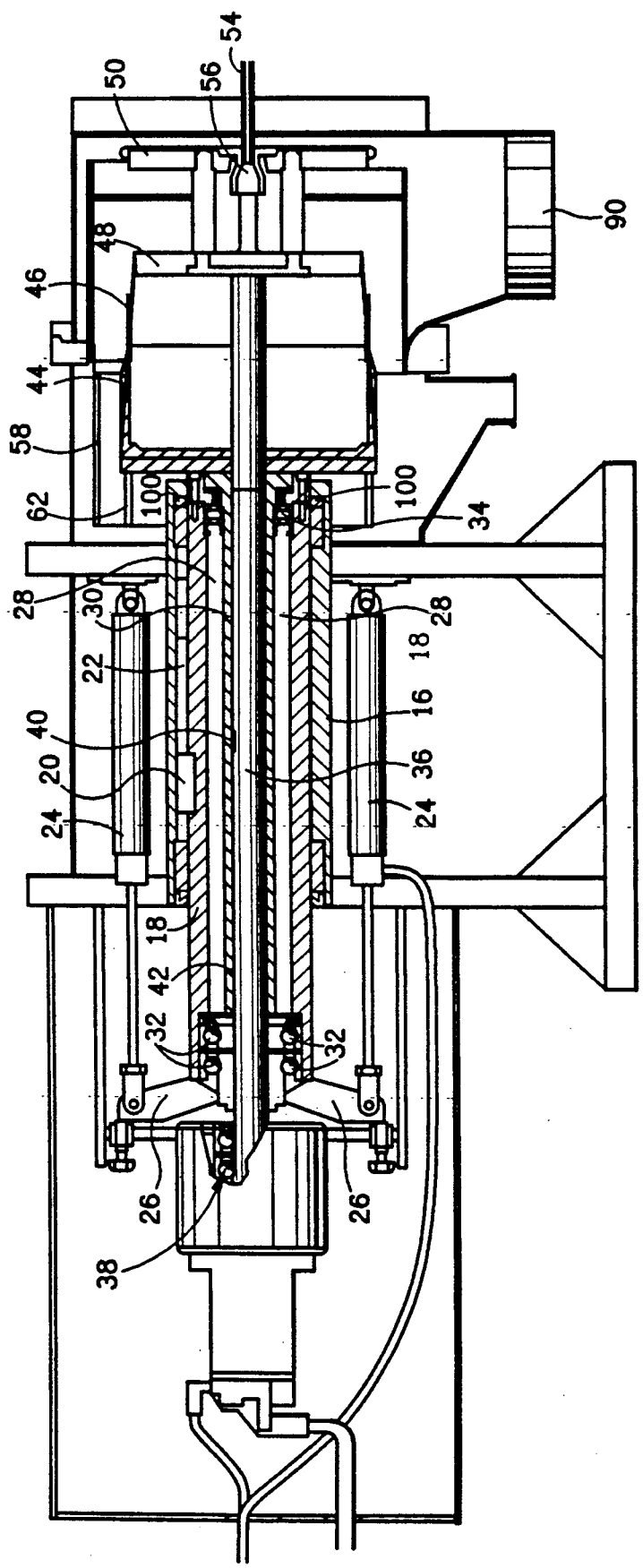
FIG. 2 is a view like FIG. 1 showing the apparatus in the unloading position.

Referring to the drawings, and particularly to FIG. 1, there is illustrated an inverting filter centrifuge for the separation of solid and liquid components found in a suspension in accordance with the present invention. The illustrated embodiment, designated generally by the numeral 10, comprises a pair of central supporting frame members in which is mounted a horizontal central tubular fixed housing member 16. A non-rotatable central elongated longitudinally slideable bearing housing 18 is slideably mounted within the fixed tubular housing 16, and keyed thereto against rotation by means of a key and key way 20 and 22. The housing member 18 is reciprocably mounted within the tubular housing member 16, and is reciprocated by means of a pair of double acting cylinders 24, which are connected at a forward end to the forward frame member 14, and having the piston rods thereof connected by means of arms 26 to the reciprocable housing 18.

A hollow or tubular rotatable shaft 30 is rotatably mounted within a rear bearing assembly 32 and a forward or front bearing assembly 34 within the bearing housing 18. The housings 30 and 18 are spaced apart and form an annular lubrication chamber 36 therebetween for containing and conveying a liquid lubricant to the front bearing assembly 34 and the rear bearing assembly 32, as will be more fully explained.

The hollow or tubular rotatable shaft 30 is reciprocably mounted on and rotatable with a central elongated shaft 36. The elongated shaft 36 is supported at its back or rear end by a bearing assembly 38 supported in a portion of the overall housing or support assembly. The hollow or tubular shaft 30 is keyed by means of a key 40 extending into a slotted key way 42 in shaft 36 to the shaft 36 to rotate therewith.

Mounted to the front end of the hollow or tubular shaft 30 is a basket or drum 44 that is perforated and is provided with its forward end with suitable clamping means not detailed for securing the forward end of a sleeve cloth filter 46. Mounted on the forward end of the central elongated shaft 36 is a first plate or disc 48, which includes clamp means for clamping the rear end of the cloth filter 46. A second plate or disc 50 is spaced forward of the disc 48 by means of spacer rods or bars 52 for providing a chamber into which is fed a slurry by means of a feeder tube or line 54 and in inlet port 56.

An annular housing or sleeve skirt 58 is spaced radially outward from and is carried with the drum 44 for providing a passageway for receiving liquid from the slurry and channeling it as indicated by the arrows to a rear portion thereof within the overall housing for discharge by way of a liquid discharge port or chute 60. A skirt extension 62 extending rearward from the drum 44 extends the annular channel for the liquid component rearward to the discharge area of the centrifuge chamber.

Figure 3:
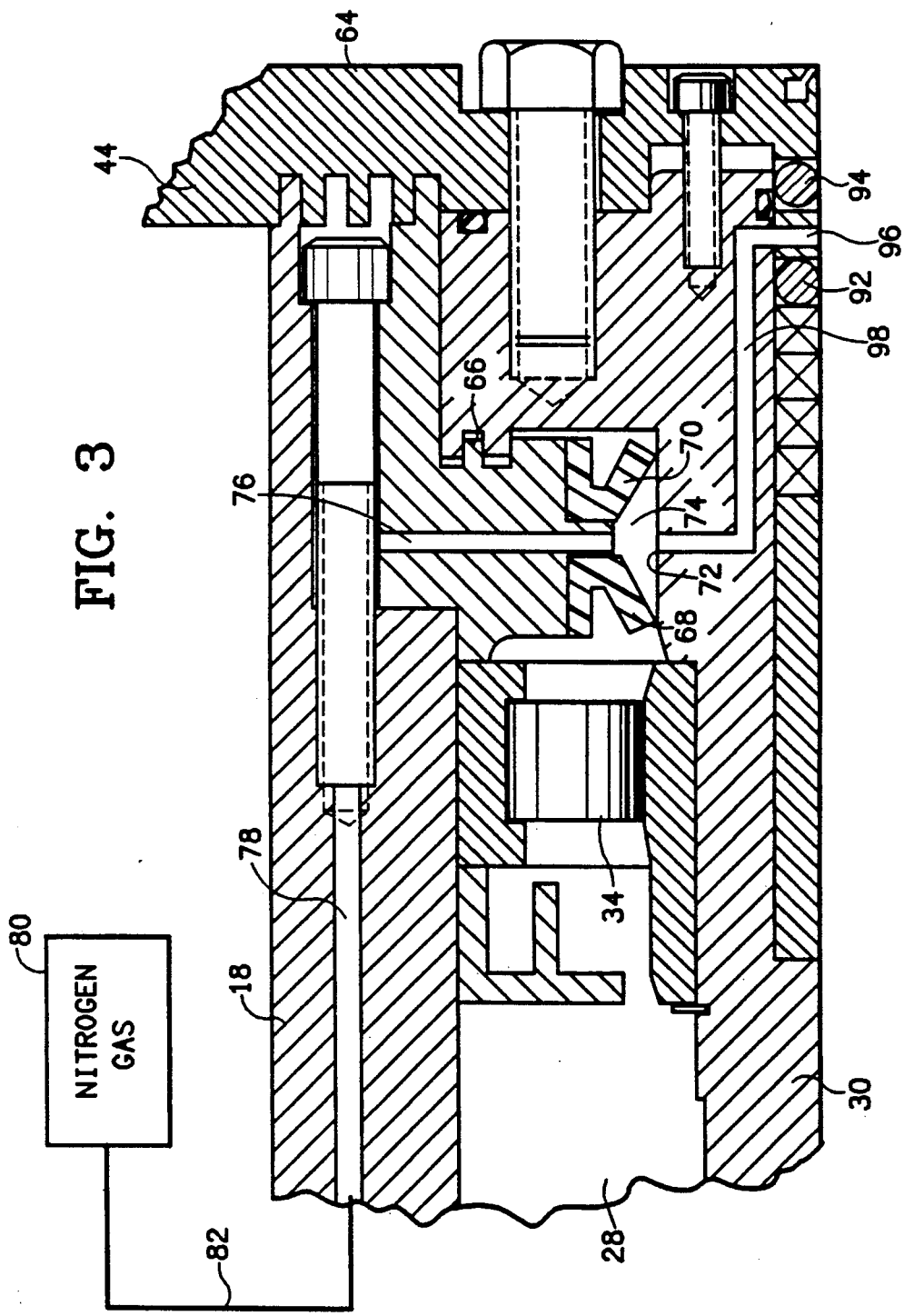
FIG. 3 is a detailed view of the bearing and seal assembly.

An improved seal assembly for maintaining separation of the liquids within the centrifuge chamber from the bearing assembly 34 is illustrated in FIG. 3. This seal assembly comprises a two-stage labyrinth seal 64 and a second stage or step 66 where the basket for drum 44 is secured to the front end of the shaft 30. A nitrogen pressure seal assembly, as more fully detailed in FIG. 3, is disposed between the lubricating chamber 36 and bearing assembly 34 and the centrifuge drum and its chamber for maintaining a separation of the liquids therein. The seal is effective to prevent or inhibit the passage of caustic and acidic liquids to the bearing assembly 34 and to prevent the passage of lubricant into product being processed.

This pressure nitrogen seal assembly comprises a pair of annular lip seals 68 and 70, preferably constructed of a chemically resistant material such as available under the trademark VITON from John Mansville Company. These annular lip seals 68 and 70 are spaced apart and have an inner annular lip in sealing engagement with an outer cylindrical surface 72 of the hollow shaft 30. These annular lip seals are disposed within an annular space or cavity 74 disposed between the end of the shaft 30 and the bearing assembly 34.

An inlet port 76 conveys a pressurized nitrogen gas from a suitable source, such as a reservoir 80, by way of a suitable line 78 and a passage 78 formed and extending along the bearing housing 18 to the space between the annular lip seals 68 and 70. The pressurized nitrogen is maintained at a positive pressure above that of the liquid lubricant in the annular chamber 28 and above the liquid within the centrifuge chamber. In most cases, this pressure may be on the order of about 5 psi. This pressurized nitrogen seal, together with the labyrinth seal has proved to be effective to inhibit the passage of liquids from the centrifuge chamber to the bearing assembly and likewise to inhibit the passage of lubricant from the bearing assembly into the centrifuge chamber.

The liquid lubricant within the chamber 28 is preferably an oil from a suitable source 86, communicated by a line 88 to a drilled passage (not shown but similar to 78) for conveying and circulating liquid lubricant to the bearings 34 and 38. The lubricant source may be, for example, tapped from the hydraulic system and preferably circulates through the chamber 28 for contacting the bearing assembly 34 at the front of the housing and the bearing assembly 32 at the rear of the housing and maintain a constant flow of fresh lubricant to the said bearings. In addition, the circulation of the lubricant fluid can also serve as a coolant for the bearing assemblies 32 and 34.

Additional nitrogen pressurized and purged seals are also preferably utilized on the forward end of all of the shafts and sleeves for sealing any lubricant in these areas from the product. For example, as illustrated in FIG. 3, a pair of annular seal member (O-rings) 92 and 94 are disposed at the front or forward end of the shaft 30. A nitrogen port 96 receives nitrogen via a passage 98 from the port 76 or another suitable passage (not shown). A similar nitrogen pressurized and purged seal 100 is positioned at the front end of housing 16.

In operation, the filter drum 44 is positioned as shown in FIG. 1 to position the filter cloth 46 within the drum. The drum is rotated by means of a suitable motor 39 driving central shaft 36 which rotates hollow shaft 30 therewith. A slurry is introduced into the drum and screen assembly via line 54 and port 56. The slurry pours into the drum and is forced by centrifugal force outward against the screen 46 which catches the solid particles and allows the liquid to flow therethrough. The liquid passes radially outward through the filter and the perforated drum and flows between the annular walls 58 and 62 and passes out the discharge chute 60.

When the cake or solids have built up to about the members 52, the supply of slurry is cut off. The drum 44 is then displaced axially toward the rear by actuation of cylinders 24 which pull bearing housing 18 and hollow shaft 30 toward the back or rear of the machine. This pulls the screen 46 backward inverting it and exposes the cake to centrifugal force discharging it from the housing via discharge chute 90. When the cake has been completely removed from the screen, the cylinders 24 are again activated forcing the shaft 30 and drum 44 forward over the screen 46 as in FIG. 1. The machine is again ready for the introduction of a supply of slurry and the foregoing process is repeated.

While I have illustrated and described my invention by means of specific embodiments, it is to be understood that numerous changes and modifications may be made therein without departing from the spirit and scope of the invention as defined in the appended claims.

I claim:

1. In an invertible filter centrifuge having a housing defining a centrifuge chamber with a perforated drum mounted in said chamber on the front end of a hollow shaft which is rotatably mounted at said front end by a front bearing assembly and slideably mounted on a central shaft, said central shaft having a base plate mounted on a front end thereof, a filter cloth disposed with one end attached to the drum and the other end attached to said base plate and normally disposed in an operative position within said drum, and double acting piston means for displacing the drum axially for displacing and inverting the filter cloth therefrom, the improvement comprising:

means for contacting bearings in said bearing assembly with a quantity of lubricating fluid;

a nitrogen gas pressurized seal disposed between said bearing assembly and said centrifuge chamber for inhibiting the passage of contaminants therebetween, said pressurized seal comprising a pair of opposed annular lip seals axially spaced along and contacting an outer surface of said hollow shaft; and means for introducing a quantity of pressurized nitrogen gas between said lip seals.

2. A centrifuge according to claim 1 wherein:

said means for introducing said nitrogen gas comprises an outlet port disposed between said lip seals, a source of nitrogen gas, and a passage in said bearing housing communicating between said source and said port.

3. A centrifuge according to claim 1 wherein:

said means for contacting said bearings comprises an annular chamber surrounding said said hollow shaft and a quantity of lubricating fluid disposed in said chamber.

4. A centrifuge according to claim 3 wherein:

said means for contacting further comprises a source of circulating lubricating fluid and means for circulating said lubricating fluid through said chamber.

5. A centrifuge according to claim 3, wherein:

said means for introducing said nitrogen gas comprises an outlet port disposed between said lip seals, a source of nitrogen gas, and a passage in said bearing housing communicating between said source and said port.

6. A centrifuge according to claim 5 wherein:

said double acting piston means comprises a pair of external hydraulic cylinders disposed around said central shaft and connected operatively connected to said hollow shaft for axially displacing same.

7. In an invertible filter centrifuge having a housing defining a centrifuge chamber with a perforated drum mounted in said chamber on the front end of a hollow shaft which is rotatably mounted in an axially moveable housing member said hollow shaft being supported at said front end by a front bearing assembly and slideably mounted on a central shaft, said central shaft having a base plate mounted on a front end thereof, a filter cloth disposed with one end attached to the drum and the other end attached to said base plate and normally disposed in an operative position within said drum, and external double acting piston means for displacing the drum axially for displacing and inverting the filter cloth therefrom, the improvement comprising;

means for contacting bearings in said bearing assembly with a quantity of lubricating fluid;

a nitrogen gas pressurized seal disposed between said bearing assembly and said centrifuge chamber for inhibiting the passage of contaminants therebetween, said pressurized seal comprising a pair of opposed annular lip seals axially spaced along and contacting an outer surface of said hollow shaft; and means for introducing a quantity of pressurized nitrogen gas between said lip seals.

8. A centrifuge according to claim 7 wherein:

said means for introducing said nitrogen gas comprises an outlet port disposed between said lip seals, a source of nitrogen gas, and a passage in said bearing housing communicating between said source and said outlet port.

9. A centrifuge according to claim 8 wherein:

said means for contacting said bearings comprises a source of circulating lubricating fluid, an annular chamber surrounding said said hollow shaft and means for circulating said lubricating fluid through said chamber.

10. In an invertible filter centrifuge having a housing defining a centrifuge chamber with a perforated drum mounted in said chamber on the front end of a hollow shaft which is rotatably mounted in an axially moveable housing member and supported at said front end by a front bearing assembly and slideably mounted for axial movement along a central shaft, said central shaft having a base plate mounted on a front end thereof, a filter cloth disposed with one end attached to the drum and the other end attached to said base plate and normally disposed in an operative position within said drum, and external double acting piston means for displacing the drum axially for displacing and inverting the filter cloth therefrom, the improvement comprising:

means for contacting bearings in said bearing assembly with a quantity of lubricating fluid; and a nitrogen gas pressurized seal disposed between said bearing assembly and said centrifuge chamber for inhibiting the passage of contaminants therebetween, said pressurized seal comprising a pair of opposed annular lip seals axially spaced along and contacting an outer surface of pressurized nitrogen gas between said lip seals comprising an outlet port disposed between said lip seals, a source of pressurized nitrogen gas, and a passage in said bearing housing communicating between said source and said outlet port.

11. A centrifuge according to claim 10 wherein:

said means for contacting said bearings comprises a source of circulating lubricating fluid, an annular chamber surrounding said said hollow shaft and means for circulating said lubricating fluid through said chamber.

12. A centrifuge according to claim 10 further comprising:

a nitrogen gas pressurized seal disposed at the front end of said hollow shaft and sealingly engaging said central shaft.

* * * * *